United States Patent
Elg et al.

(10) Patent No.: US 11,222,430 B2
(45) Date of Patent: Jan. 11, 2022

(54) METHODS, DEVICES AND COMPUTER PROGRAM PRODUCTS USING FEATURE POINTS FOR GENERATING 3D IMAGES

(71) Applicant: SONY GROUP CORPORATION, Tokyo (JP)

(72) Inventors: Johannes Elg, Helsingborg (SE); Lars Novak, Bjärred (SE); Fredrik Olofsson, Lund (SE); Pal Szasz, Lund (SE)

(73) Assignee: SONY GROUP CORPORATION, Tokyo (JP)

( * ) Notice: Subject to any disclaimer, the term of this patent is extended or adjusted under 35 U.S.C. 154(b) by 15 days.

(21) Appl. No.: 16/635,524

(22) PCT Filed: Aug. 31, 2017

(86) PCT No.: PCT/US2017/049582
§ 371 (c)(1),
(2) Date: Jan. 30, 2020

(87) PCT Pub. No.: WO2019/045724
PCT Pub. Date: Mar. 7, 2019

(65) Prior Publication Data
US 2021/0166405 A1 Jun. 3, 2021

(51) Int. Cl.
*G06T 17/00* (2006.01)
*G06T 7/246* (2017.01)
*G06T 7/579* (2017.01)

(52) U.S. Cl.
CPC ............. *G06T 7/248* (2017.01); *G06T 7/579* (2017.01); *G06T 17/00* (2013.01); *G06T 2207/30244* (2013.01)

(58) Field of Classification Search
None
See application file for complete search history.

(56) References Cited

U.S. PATENT DOCUMENTS

| | | |
|---|---|---|
| 6,996,505 B1 | 2/2006 | Edelsbrunner et al. |
| 7,023,432 B2 | 4/2006 | Fletcher et al. |
| (Continued) | | |

OTHER PUBLICATIONS

Montiel, José Mana Martinez, Javier Civera, and Andrew J. Davison. "Unified inverse depth parametrization for monocular SLAM." Robotics: Science and Systems, 2006.*

(Continued)

*Primary Examiner* — Zhengxi Liu
(74) *Attorney, Agent, or Firm* — Myers Bigel, P.A.

(57) ABSTRACT

A method for creating a 3D image is described. The method includes receiving a first 2D image and a second 2D image, identifying a plurality of first feature points in the first 2D image and a corresponding plurality of second feature points in the second 2D image, estimating a plurality of distances based on corresponding ones of the plurality of first feature points and based on corresponding ones of the plurality of second feature points, determining a mean and a standard deviation of inverses of the plurality of distances that were estimated, generating a baseline initialization coordinates based on the mean and the standard deviation of inverses of the plurality of distances, generating the 3D image based on the baseline initialization coordinates, and providing the 3D image for display. Related systems, devices and computer program products are also described.

16 Claims, 8 Drawing Sheets

(56) References Cited

U.S. PATENT DOCUMENTS 9,607,388 B2 * 3/2017 Lin .................. H04N 13/282
2014/0363048 A1 12/2014 Vrcelj et al.

OTHER PUBLICATIONS

Civera, Javier, Andrew J. Davison, and JM Martinez Montiel. "Inverse depth parametrization for monocular SLAM." IEEE transactions on robotics 24.5 (2008): 932-945.*

International Search Report and Written Opinion of the International Searching Authority, International Application PCT/US2017/049582, dated Nov. 15, 2017, 17 pp.

Munguía et al., "Concurrent Initialization for Bearing-Only SLAM", Sensors, vol. 10, Mar. 1, 2010, pp. 1511-1534.

Tomono, "3-D Localization and Mapping Using a Single Camera Based on Structure-from-Motion with Automatic Baseline Selection", Proceedings of the 2005 IEEE International Conference on Robotics and Automation, Barcelona, Spain, Apr. 18-22, 2005, pp. 3342-3347.

* cited by examiner

METHODS, DEVICES AND COMPUTER PROGRAM PRODUCTS USING FEATURE POINTS FOR GENERATING 3D IMAGES

CROSS REFERENCE TO RELATED APPLICATION

This application is a 35 U.S.C. § 371 national stage application of PCT International Application No. PCT/US2017/049582, filed on Aug. 31, 2017, the content of which is incorporated herein by reference in its entirety. The above-referenced PCT International Application was published in the English language as International Publication No. WO 2019/045724 A1 on Mar. 7, 2019.

FIELD

Various embodiments described herein relate to methods and devices for image processing and more particularly to creating 3D images.

BACKGROUND

In mono-camera systems, image-based positioning algorithms may use Simultaneous Localization and Mapping (SLAM) techniques to create 3D images for augmented reality, 3D printing, 3D model development, and other applications. SLAM is the problem of constructing or updating a map or an image while a user's location or a camera's location is non-static in the environment. In other words, the camera's location may be moving to different positions within the environment where the images are captured. An important part of using SLAM techniques is the baseline initialization of an inferred Three-Dimensional (3D) image from Two-Dimensional (2D) coordinates, at the first time 3D information is inferred from the 2D coordinates of the feature points. Poor accuracy of the baseline initialization may lead to poor quality 3D images.

SUMMARY

Various embodiments described herein provide a method for tracking the position of an image capturing device from Two-Dimensional, 2D images. The method includes receiving a first 2D image and a second 2D image, identifying a plurality of first feature points in the first 2D image and a corresponding plurality of second feature points in the second 2D image, estimating a plurality of distances based on corresponding ones of the plurality of first feature points and based on corresponding ones the plurality of second feature points. The method includes determining a mean and a standard deviation of inverses of the plurality of distances that were estimated, generating baseline initialization coordinates based on the mean and the standard deviation of inverses of the plurality of distances, generating the 3D image based on the baseline initialization coordinates, and providing the 3D image for display.

In some embodiments, the generating the baseline initialization coordinates may include generating the baseline initialization coordinates, responsive to the standard deviation of the inverses of the plurality of distances being greater than the scaled value of the mean of the inverses of the plurality of distances, and refraining from generating the baseline initialization coordinates, responsive to the standard deviation of the inverses of the plurality of distances being less than a scaled value of the mean of the inverses of the plurality of distances.

In some embodiments, refraining from generating the baseline initialization coordinates may include receiving a third 2D image, identifying a plurality of third feature points in the third 2D image that correspond to the plurality of first feature points in the first 2D image, estimating an updated plurality of distances based on corresponding ones of the plurality of first feature points and based on corresponding ones the plurality of third feature points, generating an updated mean and an updated standard deviation of the inverses of the updated plurality of distances, and generating the baseline initialization coordinates based on the updated mean and the updated standard deviation.

In some embodiments, the third 2D image may be captured at a third location that may be different from a first location where the first 2D image was captured and may be different from a second location where the second 2D image was captured. The first location may be different from the second location.

In some embodiments, receiving the third 2D image may include receiving the third 2D image, responsive to the third location associated with the third 2D image being less than a threshold angular separation from the first location associated with the first 2D image, and refraining from generating the baseline initialization coordinates, responsive to the third location associated with the third 2D image being greater than the threshold angular separation from the first location associated with the first 2D image.

In some embodiments, the scaled value may include a first scaled value. Generating the baseline initialization coordinates responsive to the standard deviation of the inverses of the plurality of distances being greater than the scaled value of the mean of the inverses of the plurality of distances may include generating the baseline initialization coordinates, responsive to the mean of the inverses of the plurality of distances plus the standard deviation of the inverses of the plurality of distances being greater than the second scaled value, and refraining from generating the baseline initialization coordinates, responsive to the mean of the inverses of the plurality of distances plus the standard deviation of the inverses of the plurality of distances being less than a second scaled value.

In some embodiments, the first scaled value may include a first constant based on historical data associated with the camera, and the second scaled value may include a second constant based on the historical data associated with the camera.

In some embodiments, generating the baseline initialization coordinates based on the updated mean and the updated standard deviation may include generating the baseline initialization coordinates, responsive to the updated standard deviation of the inverses of the plurality of distances being greater than the scaled value of the updated mean of the inverses of the plurality of distances, and responsive to the updated mean of the inverses of the plurality of distances plus the updated standard deviation of the inverses of the plurality of distances being greater than the second scaled value, and refraining from generating the baseline initialization coordinates, responsive to the updated standard deviation of the inverses of the plurality of distances being less than the scaled value of the updated mean of the inverses of the plurality of distances, or responsive to the updated mean of the inverses of the plurality of distances plus the updated standard deviation of the inverses of the plurality of distances being less than the second scaled value.

In some embodiments, the method may include receiving a user input indicating that the 3D image is to be generated.

The first 2D image may be captured at a time before the second 3D image is captured. A feature point of the plurality of first feature points and/or the plurality of second feature points is associated with an X coordinate, a Y coordinate, and a Z coordinate. The X coordinate represents a left to right location of the feature point, the Y coordinate represents a top to bottom location of the feature point, and the Z coordinate represents a distance from the camera to the feature point. The inverses of the plurality of distances may include reciprocals of the respective distances from the camera to the feature point.

In some embodiments, receiving a first 2D image and a second 2D image includes receiving a plurality of images. The first 2D image includes a 2D image that was received earliest in time of the plurality of images that were received, and the second 2D image includes a 2D image that was received most recently in time of the plurality of image that were received.

Various embodiments described herein can provide an imaging system for processing images. The imaging system includes a processor and a memory coupled to the processor and storing computer readable program code that when executed by the processor causes the processor to perform operations including receiving a first 2D image and a second 2D image from a image capturing system, identifying a plurality of first feature points in the first 2D image and a corresponding plurality of second feature points in the second 2D image, estimating a plurality of distance, Z, coordinates based on corresponding ones of the plurality of first feature points and based on corresponding ones the plurality of second feature points, determining a mean and a standard deviation of inverses of the plurality of distances that were estimated, generating baseline initialization coordinates based on the mean and the standard deviation of inverses of the plurality of distances, generating the 3D image based on the baseline initialization coordinates, and providing the 3D image for display.

Various embodiments described herein can provide a computer program product for operating an image capturing system, the computer program product comprising a non-transitory computer readable storage medium having computer readable program code embodied in the medium that when executed by a processor causes the processor to perform operations including receiving a first 2D image and a second 2D image from a image capturing system, identifying a plurality of first feature points in the first 2D image and a corresponding plurality of second feature points in the second 2D image, estimating a plurality of distances based on corresponding ones of the plurality of first feature points and based on corresponding ones the plurality of second feature points, determining a mean and a standard deviation of inverses of the plurality of distances that were estimated, generating baseline initialization coordinates based on the mean and the standard deviation of inverses of the plurality of distances, generating the 3D image based on the baseline initialization coordinates, and providing the 3D image for display. In some embodiments, the computer program product including a non-transitory computer readable storage medium having computer readable program code embodied in the medium that when executed by a processor causes the processor to perform any combination of operations of any of the method steps.

It is noted that aspects of the inventive concepts described with respect to one embodiment, may be incorporated in a different embodiment although not specifically described relative thereto. That is, all embodiments and/or features of any embodiment can be combined in any way and/or combination. Other operations according to any of the embodiments described herein may also be performed. These and other aspects of the inventive concepts are described in detail in the specification set forth below.

DETAILED DESCRIPTION

Figure 1:
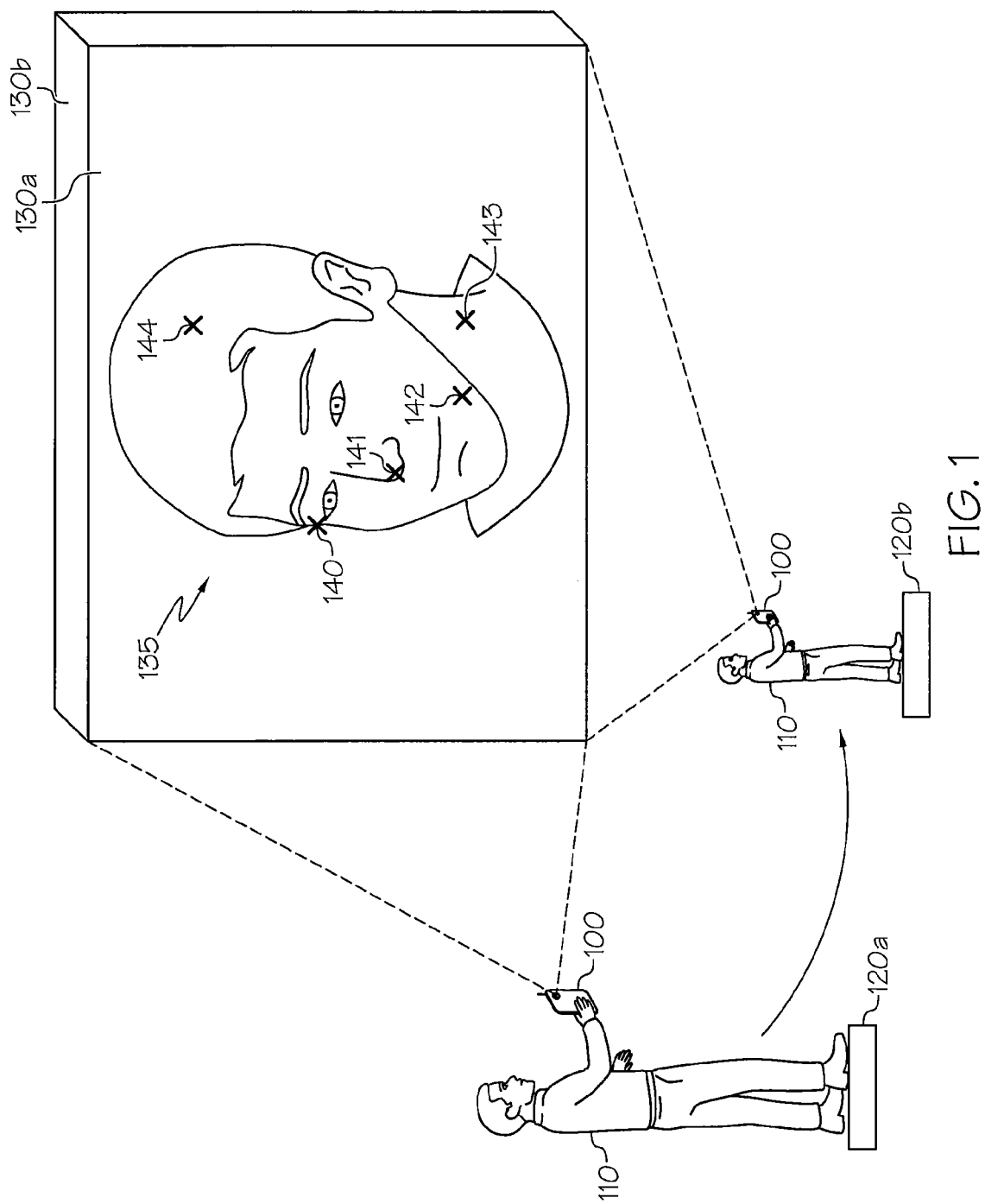
FIG. 1 illustrates a user taking pictures with a camera, according to various embodiments described herein.

Various embodiments will be described more fully hereinafter with reference to the accompanying drawings. Other embodiments may take many different forms and should not be construed as limited to the embodiments set forth herein. Like numbers refer to like elements throughout.

Applications such as 3D imaging, mapping, and navigation use Simultaneous Localization and Mapping (SLAM). SLAM is the problem of constructing or updating a map of an unknown environment while simultaneously keeping track of an object's location within it. This computational problem is recognized to be a chicken-and-egg problem since the object may be moving and the environment may be changing. 2D images of real objects may be captured with the objective of creating a 3D image that is used in real-world applications such as augmented reality, 3D printing, or 3D visualization with different perspectives of the real objects. The real 3D objects may be characterized by feature points that are specific locations on the physical object in the 2D images that are of importance for the 3D representation such as corners, edges, center points, and other specific areas on the physical object. There are several algorithms used for solving this computational problem associated with 3D imaging, using approximations in tractable time for certain environments. Popular approximate solution methods include the particle filter and Extended Kalman Filter (EKF). The particle filter, also known as a Sequential Monte Carlo (SMC) linearizes probabilistic estimates of data points. The Extended Kalman Filter is used in non-linear state estimation in applications including navigation systems such as Global Positioning Systems (GPS), self-driving cars, unmanned aerial vehicles, autonomous underwater vehicles, planetary rovers, newly emerging domestic robots, medical devices inside the human body, and imaging systems. Imaging systems may perform 3D pose estimation using SLAM techniques by performing a transformation of an object in a 2D image to produce a 3D object. However, existing techniques such as SMC and EKF may be insufficient in accurately estimating and positioning various points in a 3D object based on information discerned from 2D objects.

Various embodiments described herein may arise from the recognition that a crucial step in generating a 3D image is baseline initialization of inferring the coordinates of feature points from a 2D image. In some environments it is difficult to extract corners or edges from a 2D image, particularly with regards to the depth or distance from the camera that captured the 2D image. However, feature points in the 2D image, typically ones associated with the corners or edges, may need to be identified. Each feature point may be described as an X coordinate that represents a left to right location of the feature point within the image, a Y coordinate that represents a top to bottom location of the feature point within the image, and a Z coordinate that represents the depth or distance of the feature point from the camera. The Z coordinate is especially difficult to determine. The baseline initialization of the Z coordinate is critical to eventually obtaining a clear and accurate 3D image. Various embodiments described herein can provide solutions to improve the accuracy of the baseline initialization of the Z coordinate by adding verification checks based on the statistical distribution of the feature points in space will be discussed in detail.

Image sensors may be collocated with or integrated with a camera. The terms "image sensor", "image capturing system" and "camera" will be used herein interchangeably. The camera may be implemented with integrated hardware and/or software as part of an electronic device, or as a separate device. Types of cameras may include mobile phone cameras, security cameras, wide-angle cameras, narrow-angle cameras, and/or monoscopic cameras.

FIG. 1 illustrates a user taking pictures with a camera at various locations around the object. Although the foregoing examples discuss the images acquired from a camera, the images that are processed may be previously residing in memory or the images be sent to the processing unit for processing according to various embodiments described herein. Referring now to FIG. 1, a user 110 has a camera 100 that they initiate a photographic session of an object 135, such as a person's face or an automobile, at location 120a. The user 110 may physically move around the object 135 to various locations such as from location 120a to location 120b. An image 130 of object 135 is captured at each location. For example, image 130a is captured when the camera 100 is at location 120a and image 130b is captured when camera 100 moves to location 120b. Each of the captured images may be 2D images. There may be a continuous flow of images from the camera as the user walks around the object 135 that is being photographed to capture images at various angles. Once at least two images, such as images 130a and 130b are captured, the images may be processed by a processor in camera 100 or a processor external to the camera 100 to generate a 3D image. A baseline initialization of the 3D image may occur once the first two images are captured. The quality of the baseline initialization is evaluated to see if a satisfactory baseline initialization has occurred. Otherwise, further processing of additional images may take place. The baseline initialization of the 3D image may be used to generate a 3D image and/or a 3D mesh, which may be subsequently provided for display on a display device and/or screen.

The images may be processed by identifying feature points on the object 135 that were captured in the first image 130a and/or second image 130b. The feature points may be various edges, corners, or other points on object 135. The feature points are recognizable locations on the physical object that are tracked in various images of the physical object. Still referring to FIG. 1, feature points in the object 135 may include feature points 140 through 144. When the user 110 moves the camera 100 to a different location 120b, another image 130b is captured. This same process of capturing images and identifying feature points may occur on the order of tens, hundreds, or thousands of times in the context of creating a 3D image. The same feature points 140 through 144 may be identified in the second image 130b. The X, Y, and/or Z coordinates of the feature points 140 through 144 are estimated using various statistical techniques, as will now be discussed with respect to FIG. 2.

Figure 2:
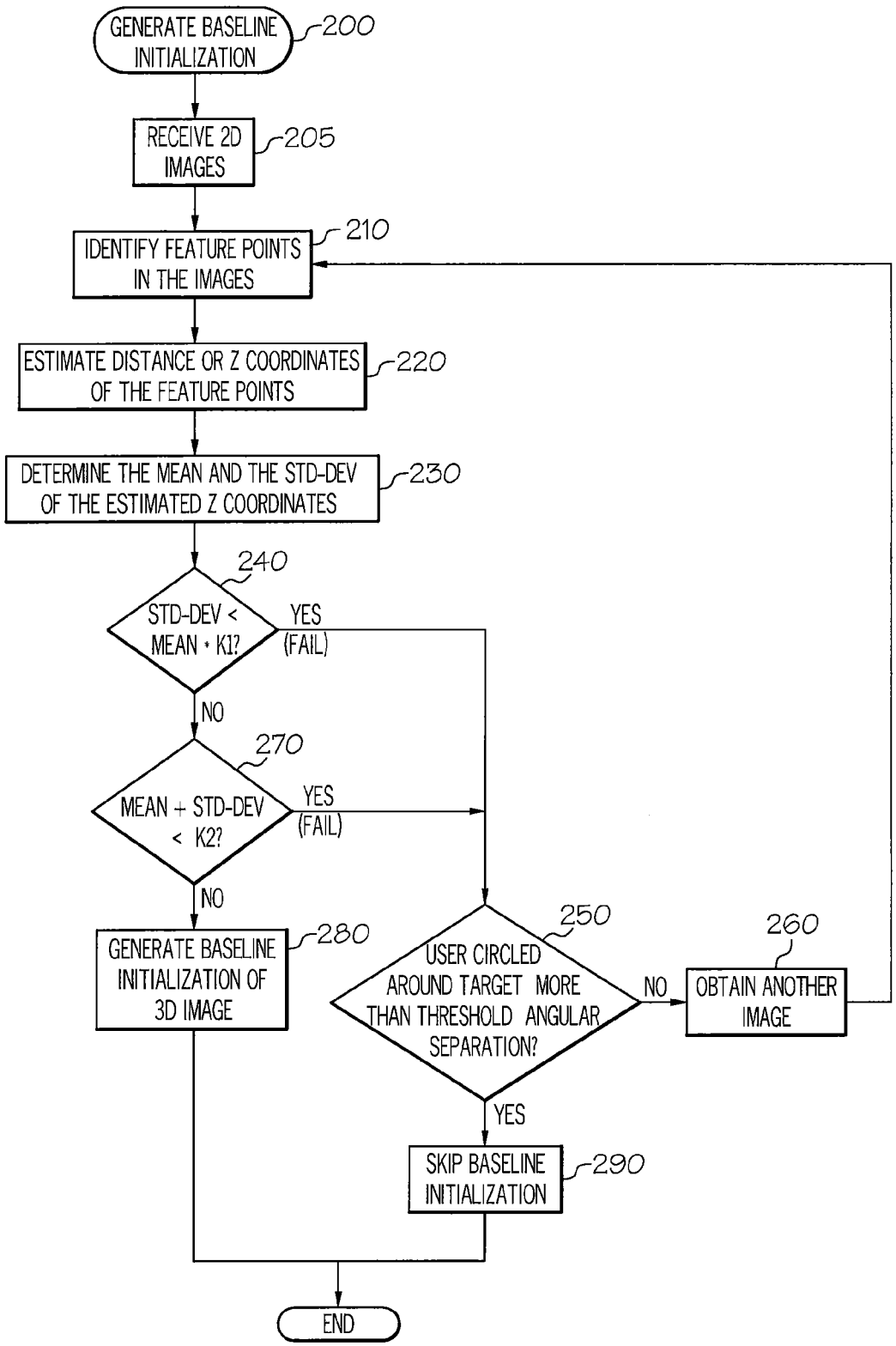
FIG. 2 is a flowchart of operations to process 2D images to generate baseline initialization coordinates, according to various embodiments described herein.

FIG. 2 is a flowchart of operations to process 2D images to generate baseline initialization of a 3D image. Referring now to FIG. 2, it may be necessary to generate baseline initialization for 3D image creation, at block 200. 2D images 130 of FIG. 1 are received at block 205. Feature points in a first one of the 2D images and corresponding feature points in a second one of the 2D images are identified at block 210. The distances or Z coordinates of the feature points represent the distance from the camera, corresponding to the forward or backward location of the feature point in the 2D image. The distance may be a Euclidean distance, a distance from a point on the image to the camera, or a distance from a point to a plane associated with the camera. Typically, the distance or Z coordinate for a 3D image is estimated with less precision than the X coordinate or the Y coordinate of a feature point since the X coordinate and the Y coordinate are readily available for a 2D image. Therefore, improved precision of estimating the Z coordinate is of particular interest when creating 3D images. The distance or Z coordinate of each of the feature points, based on the two images, is estimated, at block 220. For example, for each feature point, such as, feature point 141 on the nose of object 135 in FIG. 1, the distance from the camera is estimated based relative depth differential of the feature point in the two images. This process is repeated for each of the feature points that have been identified. In some embodiments, up to 1000 feature points may be identified, with typically between 20 and 200 feature points used to provide an acceptable 3D image.

Still referring to FIG. 2, statistical analysis of the estimated distances of the feature points is conducted. For each feature point, such as, feature point 140 on the nose of object 135 in FIG. 1, the distance is estimated, as discussed with respect to block 220. The mean and standard deviation of the inverse of the Z coordinates is determined, at block 230. The Z coordinate is a distance from the camera such that the inverse of the Z coordinate may be a mathematical inverse, $1/Z$.

The inverse of Z is used for this evaluation since points closer to the camera may be of greater interest in determining an initialization baseline of the distance or Z coordinate. For example, a feature point that is 10 meters from the camera may provide stronger precision of distance estimation than a point that is 100 meters from the camera. As such the inverse values of 0.1 vs. 0.01 would give more weight to the closer point that is 10 meters from the camera, when computing the statistical mean.

An evaluation of whether the standard deviation of the inverse value is less than a scaled version of the mean of the inverses is performed at block 240. In other words, the mean of the inverses of the distances of the feature points is multiplied by a constant k1 that is based on historical data for the camera. The value of constant k1 may vary for different types of cameras such as ones with a telephoto lens versus zoom lens based on specific camera tolerances that vary parameters such as lens distortion. In some embodiments, the range of the constant k1 may be between 0 and 1.0. In an example embodiment, constant k1=0.33 for a mono-lens camera. The evaluation at block 240 is checking for a reasonable spread of close and far feature points in the two images that are used in this evaluation. If the evaluation at block 240 fails (i.e. true), another image (i.e. a third image) may be obtained from the camera, at block 260. Flow then proceeds back to block 210 to identify feature points in the first and third images. The feature points used between the first and third images may be the same feature points as were previously used in the first and second images, or may include some different feature points than previously used.

Still referring to FIG. 2, if the evaluation at block 240 is false, flow may proceed to block 270 for a second evaluation that checks to make sure enough feature points close to the camera are included in the data set. An evaluation to check to see if the sum of the mean and the standard deviation of the inverses of the distances or Z coordinates of the feature points is less than a constant k2, at block 270. Similar to k1, the value of constant k2 may be based on historical data and may vary for different types of cameras based on specific camera tolerances that vary parameters such as lens distortion. In some embodiments, the range of the constant k1 may be between 0 and 1.0. In an example embodiment, constant k2=0.33 for a mono-lens. Constants k1 and k2 may be equivalent to one another or different from one another. If the evaluation at block 270 is false, a baseline initialization of the distances or Z coordinates of the 3D image is generated at block 280. If the evaluation at block 270 fails (i.e. true), then flow proceeds to block 260 to obtain another image, after evaluation of block 250. The other image obtained at block 260 may be the third image, as discussed earlier, or a subsequent fourth or later image. Either of the evaluations at block 240 and/or at block 270 may be optional, according to some embodiments. In other words, only one of the two checks at blocks 240 and 270 may be performed, according to some embodiments.

Continuing reference to FIG. 2, if the user moves around the object more than a certain angular separation (i.e. number of degrees or radian), it may be determined that a suitable baseline initialization, as performed in FIG. 2, is not possible. Therefore, to prevent indefinitely processing too many images or extended processing time, a check may be performed, at block 250, to see if the user has circled around the target object more than a threshold angular separation. In some embodiments, this check may include determining if a threshold number of images have been exceeded. If the check at block 250 is false, then another image may be obtained at block 260, as discussed above. If the check at block 250 is true, then the baseline initialization with respect to the distances or Z coordinate may be skipped, at block 290, and the system may revert to legacy methods to determine and/or initialize the distances or Z coordinate. FIGS. 3 through 9 provide further details of the operations described in the flowchart of FIG. 2.

According to some embodiments, a method of generating initialization coordinates for localization and mapping and/or tracking the position of an image capturing device 2D images may include obtaining a first 2D image and a second 2D image taken with the image capturing device, identifying a plurality of first feature points in the first 2D image and a corresponding plurality of second feature points in the second 2D image, estimating corresponding 3D coordinates of the feature points and 3D position of the image capture device in a 3D coordinate system, and estimating a plurality of distances between each 3D coordinate and the image capturing device. In some embodiments, the distance may be between the 3D coordinate and an image plane of the image capturing device. The method may include determining a mean and a standard deviation of inverses of the plurality of distances that were estimated, selectively generating initialization coordinates of the 3D coordinates of the feature points and 3D position of the image capture device based on the mean and the standard deviation of inverses of the plurality of distances, and tracking the 3D position of the image capturing device in the 3D coordinate system based on the initialization coordinates. Tracking the 3D position of the image capturing device may include following the camera positioning with respect to an object in the image.

Figure 3:
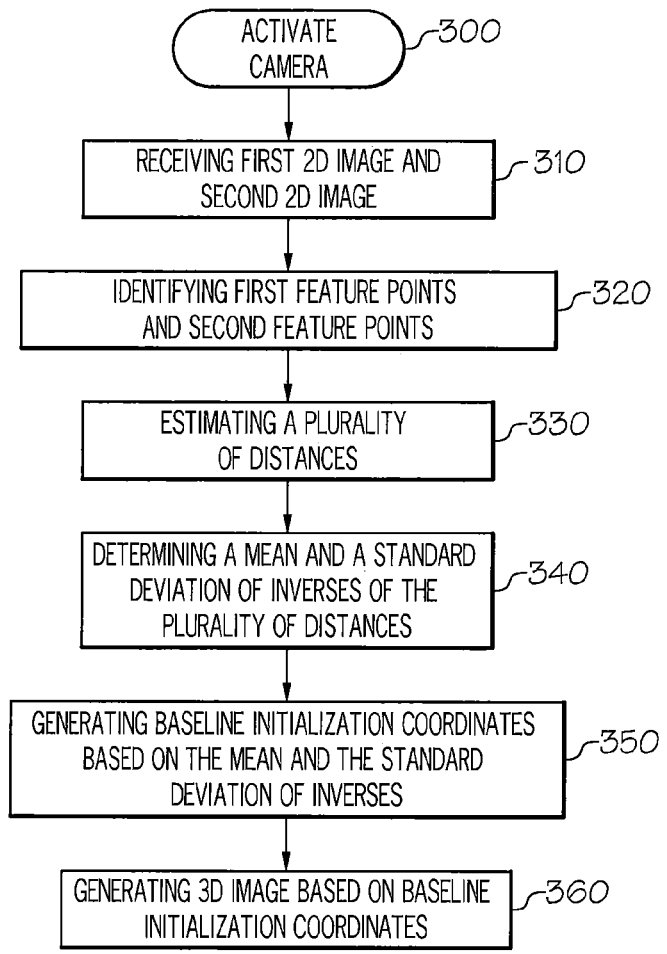
FIGS. 3 to 9 are flowcharts of operations for inferring 3D images, according to various embodiments described herein.

FIG. 3 is a flowchart of operations for inferring a 3D image. Referring now to FIG. 3, a camera or image capture system may be activated by a user, at block 300 of FIG. 3, which may correspond to block 200 of FIG. 2. As used herein, a camera or image capture system may include any device with an image sensor, security cameras, cameras integrated with mobile devices, wide-angle cameras, narrow-angle cameras, and/or monoscopic cameras. Activation by the user may include pressing a button or other indication on the camera or associated mobile device, viewing or selecting previously collected images, pointing the camera at an object by the user, or a GPS or other positioning device or accelerometer recognizing that the camera is moving around an object. A first 2D image and a second 2D image are received from a camera, at block 310 of FIG. 3, which may correspond to block 205 of FIG. 2. A plurality of first feature points and a plurality of second feature points in the 2D images are identified, at block 320 of FIG. 3, which may correspond to block 210 of FIG. 2. As discussed with respect to FIG. 1, the feature points may be points of interest on an object in the 2D image. A plurality of distance coordinates, i.e. Z coordinates for each feature point are estimated, at block 330. The Z coordinate represents a distance of the feature point from the camera. A mean and a standard deviation of the inverses of the plurality of distances or Z coordinates are determined, at block 340 of FIG. 3, which may correspond to block 230 of FIG. 2. Baseline initialization coordinates are generated based on the mean and the standard deviation of the inverses of the plurality of distances or Z coordinates, at block 350 of FIG. 3, which may correspond to block 280 of FIG. 2. A 3D image is generated based on the baseline initialization coordinates, at block 360. The 3D image may be provided for display. In some embodiments, the 3D image may be provided to a 3D printer or to a display device or be used in conjunction with an application such as an augmented reality application.

Figure 4:
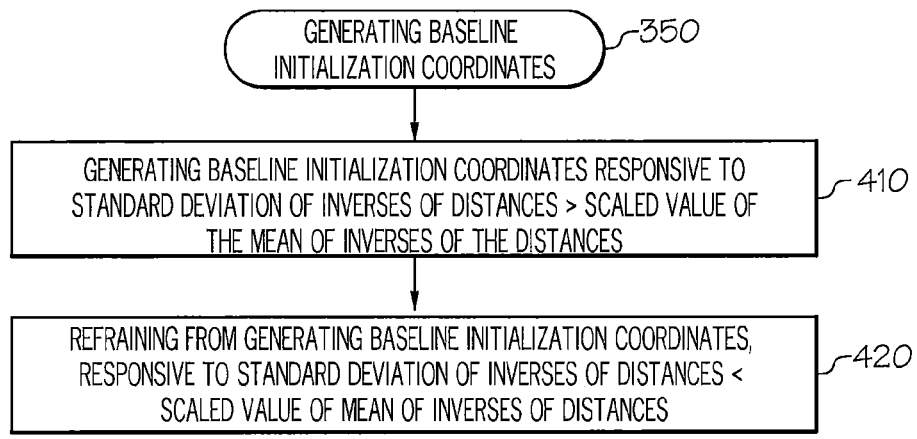

FIG. 4 illustrates a flowchart of operations for generating the baseline initialization coordinates, at block 350 of FIG. 3, which corresponds to block 280 of FIG. 2. Referring now to FIG. 4, the baseline initialization coordinates are generated responsive to the standard deviation of the inverses of the plurality of the coordinates being greater than a scaled value times the mean of the inverses of the plurality of distances or Z coordinates, at block 410. The baseline initialization coordinates are refrained from being generated, responsive to the standard deviation of the inverses of the plurality of distances or Z coordinates being less than the scaled value times the mean of the inverses of the plurality of the distances or Z coordinates, at block 420. In some embodiments, if the standard deviation of the inverses of the plurality of the coordinates is equal to a scaled value times the mean of the inverses of the plurality of distances or Z coordinates, the baseline initialization coordinates may be generated, whereas, in other embodiments, the baseline initialization coordinates may not be generated.

Figure 5:
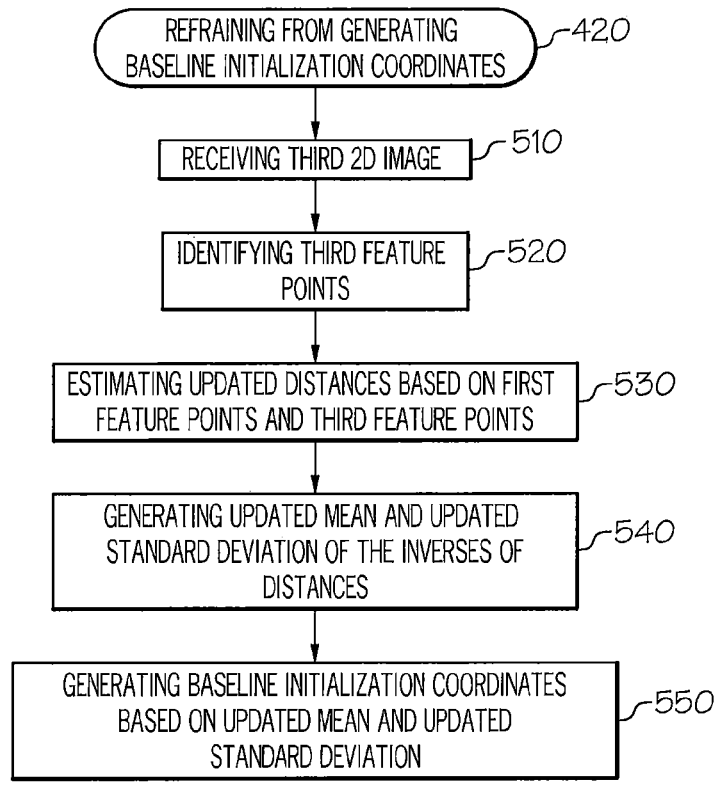

FIG. 5 illustrates a flowchart of operations for refraining from generating the baseline initialization coordinates, as discussed with respect to block 420 of FIG. 4. Referring now to FIG. 5, a third 2D image is received from the camera, at block 510. A plurality of third feature points are identified in the third 2D image, at block 520. These third features points may correspond to the same locations on the object. For example, the feature points in the first 2D image and the third 2D image may both correspond to the nose and the eyes in each of the images. An updated plurality of the coordinates are estimated based on the plurality of first feature points from the first image and the plurality of third feature points from the third image, at block 530. Although the third 2D image may be the third image that is captured by the camera, this estimate may be made based on any two images of the object. For example the first image and the most recent image may be used, or the second image and/or the next-to-most recent image may be used in making this estimation. In other words, any of the embodiment described herein may be implemented using any two 2D images captured by the camera. Specifically, the ordering of the images may not be relevant to the embodiments described herein such that any two images may be used for generating the baseline initialization and/or 3D image.

Still referring to FIG. 5, an updated mean and an updated standard deviation of the inverses of the updated plurality of the coordinates may be generated, at block 540. The baseline initialization coordinates may be generated based on the updated mean and the updated standard deviation, at block 550. An additional image was thus obtained an evaluated when there was not a good spread of close and far points in the images and/or not enough close points to generate a satisfactory baseline initialization. The third 2D image is captured at a third location that is different from a first location where the first 2D image was captured and is different from a second location where the second 2D image was captured. This ensures a proper spreading of the points in the images that are used. These location are different to provide different angles of camera views to object a better baseline initialization.

Figure 6:
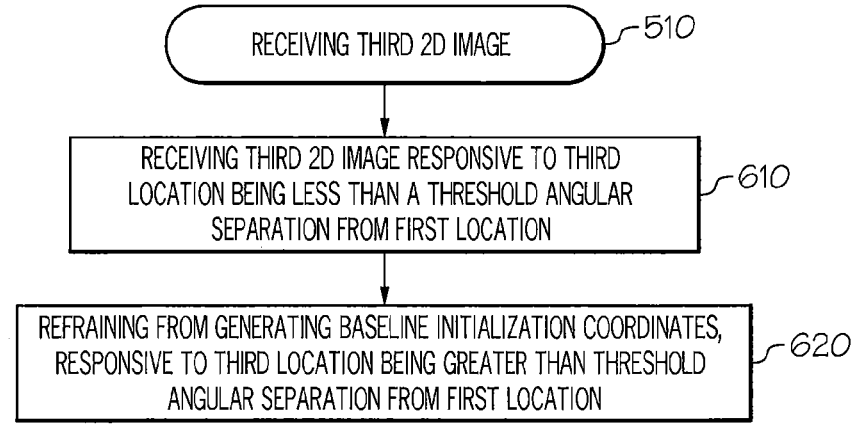

FIG. 6 illustrates a flowchart of operations for retrieving the third 2D image from the camera, as described with respect to block 510 of FIG. 5. Referring now to FIG. 6, the third 2D image is received from the camera, responsive to the third location associated with the third 2D image being less than a threshold angular separation (i.e. number of degrees or number of radians) from the first location associated with the first 2D image, at block 610. This threshold angular separation may include multiple angular rotations around the object. Although this is described in the context of a user circling around an object, in some embodiments, the third 2D image may be qualified by the camera's location being within a threshold distance from the original location of the camera when the first 2D image was captured. The relative position of the camera and the 2D are determined for cases where the object and/or camera have moved. The baseline initialization coordinates are refrained from being generated, responsive to the third location associated with the third 2D image being greater than the threshold number of degrees from the first location associated with the first 2D image, at block 620. Although this example describes the angular separation between the first and third images, it should be noted that these designations are for convenience and do not imply an ordering of images. These concepts may be applied to any two images.

Figure 7:
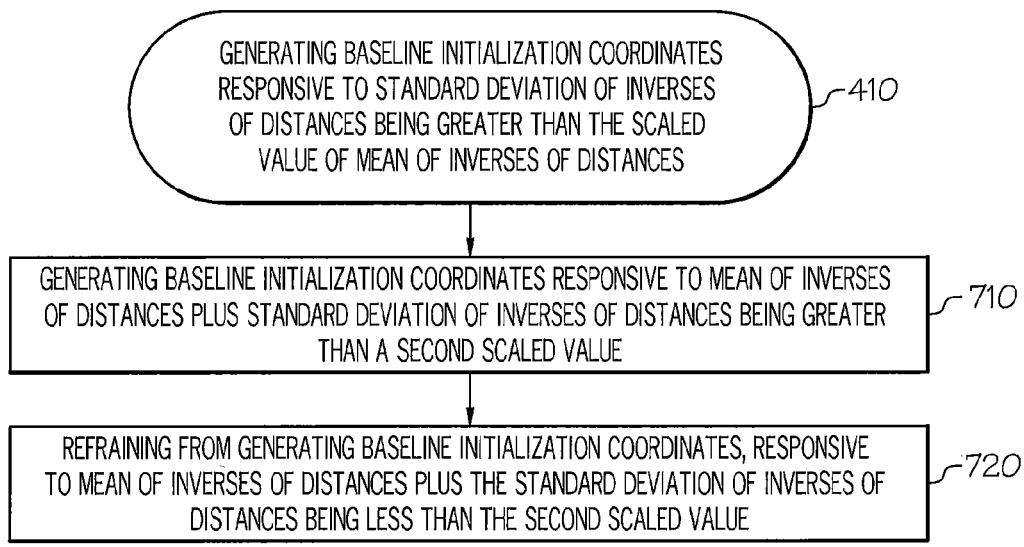

FIG. 7 illustrates a flowchart of operations for generating the baseline initialization coordinates, as described with respect to block 410 of FIG. 4. Referring now to FIG. 7, the baseline initialization coordinates are generated responsive to the mean of the inverses of the plurality of distances or Z coordinates plus the standard deviation of the inverses of the plurality of distances or Z coordinates being greater than a second scaled value, at block 710. The baseline initialization coordinates are refrained from being generated, responsive to the mean of the inverses of the plurality of distances or Z coordinates plus the standard deviation of the inverses of the plurality of the distances or Z coordinates being less than the second scaled value, at block 720.

Figure 8:
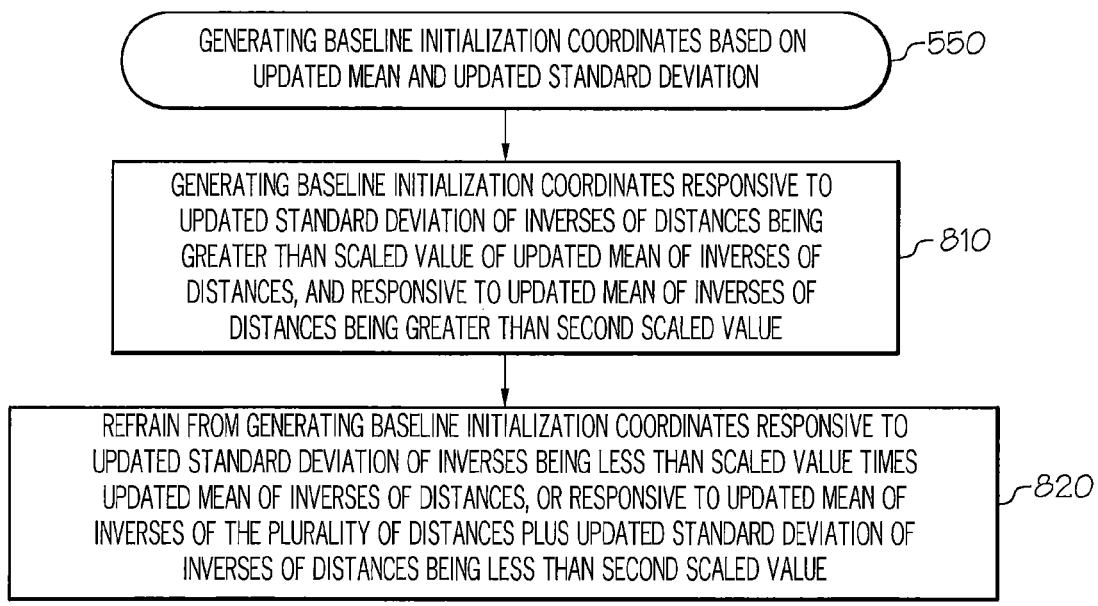

FIG. 8 illustrates a flowchart of operations for generating the baseline initialization coordinates based on the updated mean and the updated standard deviation as discussed with respect to block 550 of FIG. 5. Referring now to FIG. 8, the baseline initialization coordinates are generated responsive to the updated standard deviation of the inverses of the plurality of distances or Z coordinates being greater than the scaled value times the updated mean of the inverses of the plurality of the coordinates, and responsive to the updated mean of the inverses of the plurality of distances or Z coordinates plus the updated standard deviation of the inverses of the distances or Z coordinates being greater than the second scaled value, at block 810. The baseline initialization coordinates are refrained from being generated, responsive to the updated standard deviation of the inverses of the plurality of distances or Z coordinates being less than the scaled value times the updated mean of the inverses of the plurality of the coordinates, and responsive to the updated mean of the inverses of the plurality of distances or Z coordinates plus the updated standard deviation of the inverses of the distances or Z coordinates being less than the second scaled value, at block 820.

Figure 9:
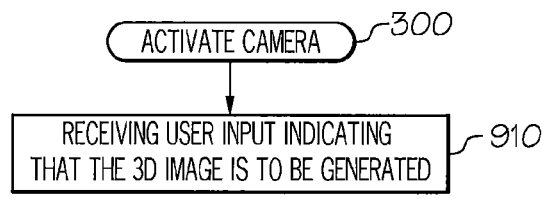

FIG. 9 illustrates a flowchart of operations for inferring a 3D image upon activating a camera by a user as discussed with respect to block 300 a FIG. 3. Referring now to FIG. 9, a user input is received that indicates that the 3D image is to be generated, at block 910. The user may trigger the creation of the 3D image on the camera. Multiple 2D images, may be captured and processed as described herein. In some embodiments, multiple 2D images may have been previously captured and stored either in the camera or in memory associated with the camera. The images may be stored in the camera location or in a location that is remotely accessible across a network.

Figure 10:
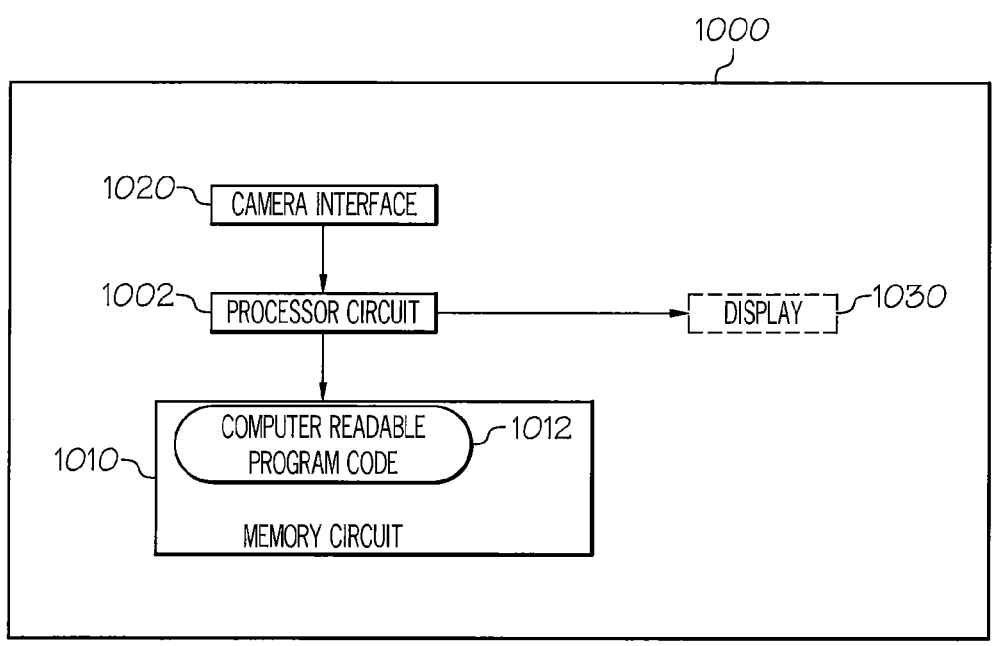
FIGS. 10 and 11 are block diagrams of wireless electronic devices, according to various embodiments described herein.

FIG. 10 is a block diagram of an image processing system 1000 of an electronic device such as camera 100 of FIG. 1 in an image processing system. The image processing system 1000 may be integrated with the camera and/or may be external to the camera and is configured to perform operations according to one or more embodiments disclosed herein. Referring to FIG. 10, the image processing system 1000 includes a display circuit 1030, a processor circuit 1002, and a memory circuit 1010 containing computer readable program code 1012. The processor circuit 1002 may include one or more data processing circuits, such as a general purpose and/or special purpose processor, e.g., microprocessor and/or digital signal processor, that may be collocated or distributed across one or more networks. The processor circuit 1002 is configured to execute the computer readable program code 1012 in the memory 1010 to perform at least some of the operations and methods of described herein as being performed by the image processing module 1000. The camera interface 1020 is coupled to the processor circuit 1002 and may communicate with a server or other external network entity, directly or indirectly.

Figure 11:
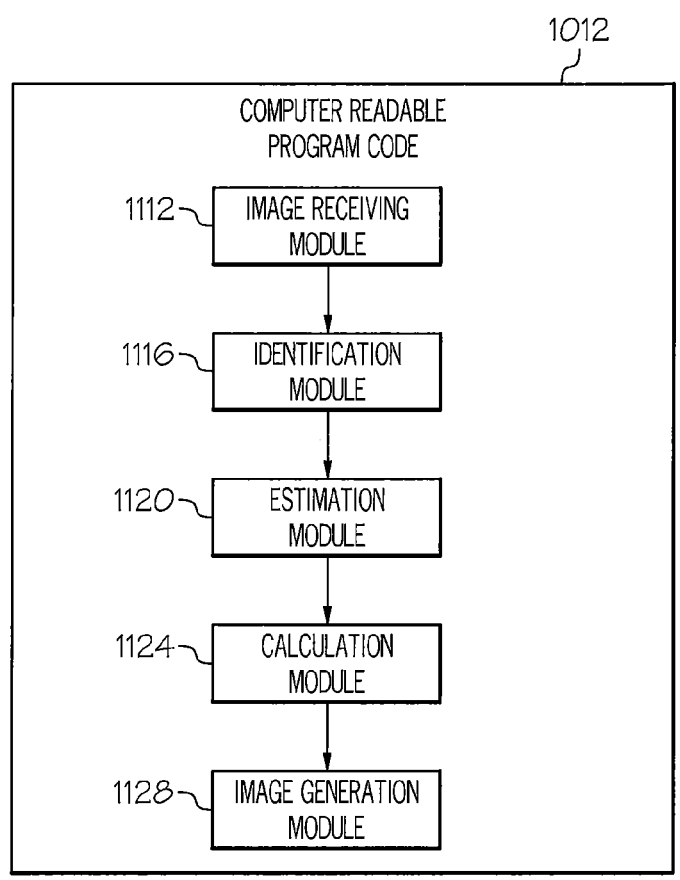

FIG. 11 illustrates modules for an image processing module that perform operations as disclosed herein according to some embodiments. The computer readable program code 1012 of FIG. 10 may include one or more modules. Referring now to FIG. 11, the computer readable program code 1012 may include an image receiving module 1112, an identification module 1116, an estimation module 1120, a calculation module 1124, and/or an image generation module 1128. The image receiving module 1112 is for performing reception of 2D images (block 310 of FIG. 3). The identification module 1116 is for identifying feature points in the 2D images (block 320 of FIG. 3). The estimation module 1120 is for estimating distances or Z coordinates based on the 2D images (block 330 of FIG. 3). The calculation module 1124 is for performing operations related to the mean and/or standard deviation of the distances or Z coordinates, as described with respect to block 240 of FIG. 2, block 270 of FIG. 2, block 340 of FIG. 3, and/or block 720 of FIG. 7. The image generation module 1128 is for generating a baseline initialization 3D image (block 350 of FIG. 3.) The modules 1112, 1116, 1120, 1124, and 1128 may perform other corresponding operations and methods disclosed herein.

Various embodiments presented herein have described improved methods for generating 3D images based on 2D images. Specifically, solutions to improve the accuracy of the baseline initialization of a 3D image by inferring the coordinates of feature points from a 2D image has been improved by techniques described herein. This may be achieved using statistical qualification based on the mean and/or standard deviations of estimates of distances or Z coordinates of features of the 2D images. Although the embodiments described herein have been in the context of a mobile camera, these techniques may be applied to other imaging systems such as security cameras, medical imaging, etc.

Further Definitions:

In the above-description of various embodiments of the present disclosure, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/BlueRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present disclosure may be embodied in hardware and/or in software (including firmware, resident software, microcode, etc.) that runs on a processor such as a digital signal processor, which may collectively be referred to as "circuitry," "a module" or variants thereof.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination. Many variations and modifications can be made to the embodiments without substantially departing from the principles of the present invention. All such variations and modifications are intended to be included herein within the scope of the present invention.

The invention claimed is:

1. A method of tracking a position of an image capturing device from Two-Dimensional, 2D images, the method comprising:
   receiving a first 2D image and a second 2D image taken with the image capturing device;
   identifying a plurality of first feature points in the first 2D image and a corresponding plurality of second feature points in the second 2D image;
   estimating a plurality of distances based on corresponding ones of the plurality of first feature points and based on corresponding ones of the plurality of second feature points;
   determining a mean and a standard deviation of inverses of the plurality of distances that were estimated;
   generating baseline initialization coordinates based on the mean and the standard deviation of inverses of the plurality of distances, responsive to the standard deviation of the inverses of the plurality of distances being greater than a first scaled value of the mean of the inverses of the plurality of distances, and responsive to the mean of the inverses of the plurality of distances plus the standard deviation of the inverses of the plurality of distances being greater than a second scaled value;
   refraining from generating the baseline initialization coordinates, responsive to the standard deviation of the inverses of the plurality of distances being less than the first scaled value of the mean of the inverses of the plurality of distances, and responsive to the mean of the inverses of the plurality of distances plus the standard deviation of the inverses of the plurality of distances being less than the second scaled value; and
   generating a 3D image based on the baseline initialization coordinates.

2. The method of claim 1, wherein the refraining from generating the baseline initialization coordinates comprises:
   receiving a third 2D image;
   identifying a plurality of third feature points in the third 2D image that correspond to the plurality of first feature points in the first 2D image;
   estimating an updated plurality of distances based on corresponding ones of the plurality of first feature points and based on corresponding ones of the plurality of third feature points;
   generating an updated mean and an updated standard deviation of the inverses of the updated plurality of distances; and
   generating the baseline initialization coordinates based on the updated mean and the updated standard deviation.

3. The method of claim 2,
   wherein the third 2D image is captured at a third location that is different from a first location where the first 2D image was captured and is different from a second location where the second 2D image was captured, and
   wherein the first location is different from the second location.

4. The method of claim 3, wherein the receiving the third 2D image comprises:
   receiving the third 2D image, responsive to the third location associated with the third 2D image being less than a threshold angular separation from the first location associated with the first 2D image; and refraining from generating the baseline initialization coordinates, responsive to the third location associated with the third 2D image being greater than the threshold angular separation from the first location associated with the first 2D image.

5. The method of claim 1,
wherein the first scaled value comprises a first constant based on historical data associated with a camera that captured the first 2D image and/or the second 2D image, and
wherein the second scaled value comprises a second constant based on the historical data associated with the camera that captured the first 2D image and/or the second 2D image.

6. The method of claim 1, wherein the 3D image comprises a first 3D image further comprising:
receiving a user input indicating that the first 3D image is to be generated,
wherein the first 2D image is captured at a time before a second 3D image is captured.

7. The method of claim 1, the inverses of the plurality of distances comprise reciprocals of respective distances from a camera to the feature point.

8. The method of claim 1,
wherein the receiving a first 2D image and a second 2D image comprises receiving a plurality of images,
wherein the first 2D image comprises a 2D image that was received earliest in time of the plurality of images that were received, and
wherein the second 2D image comprises a 2D image that was received most recently in time of the plurality of image that were received.

9. A method of tracking a position of an image capturing device from Two-Dimensional, 2D images, the method comprising:
receiving a first 2D image and a second 2D image taken with the image capturing device;
identifying a plurality of first feature points in the first 2D image and a corresponding plurality of second feature points in the second 2D image;
estimating a plurality of distances based on corresponding ones of the plurality of first feature points and based on corresponding ones of the plurality of second feature points;
determining a mean and a standard deviation of inverses of the plurality of distances that were estimated;
receiving a third 2D image;
identifying a plurality of third feature points in the third 2D image that correspond to the plurality of first feature points in the first 2D image;
estimating an updated plurality of distances based on corresponding ones of the plurality of first feature points and based on corresponding ones of the plurality of third feature points;
generating an updated mean and an updated standard deviation of the inverses of the updated plurality of distances;
generating baseline initialization coordinates, responsive to the updated standard deviation of the inverses of the plurality of distances being greater than a first scaled value of the updated mean of the inverses of the plurality of distances, and responsive to the updated mean of the inverses of the plurality of distances plus the updated standard deviation of the inverses of the plurality of distances being greater than a second scaled value;
refraining from generating the baseline initialization coordinates, responsive to the updated standard deviation of the inverses of the plurality of distances being less than the first scaled value of the updated mean of the inverses of the plurality of distances, or responsive to the updated mean of the inverses of the plurality of distances plus the updated standard deviation of the inverses of the plurality of distances being less than the second scaled value; and
generating a 3D image based on the baseline initialization coordinates.

10. An imaging system for processing images, the imaging system comprising:
a processor; and
a memory coupled to the processor and storing computer readable program code that when executed by the processor causes the processor to perform operations comprising:
receiving a first 2D image and a second 2D image from an image capturing system;
identifying a plurality of first feature points in the first 2D image and a corresponding plurality of second feature points in the second 2D image;
estimating a plurality of distances based on corresponding ones of the plurality of first feature points and based on corresponding ones of the plurality of second feature points;
determining a mean and a standard deviation of inverses of the plurality of distances that were estimated;
generating baseline initialization coordinates based on the mean and the standard deviation of inverses of the plurality of distances, responsive to the standard deviation of the inverses of the plurality of distances being greater than a first scaled value of the mean of the inverses of the plurality of distances, and responsive to the mean of the inverses of the plurality of distances plus the standard deviation of the inverses of the plurality of distances being greater than a second scaled value;
refraining from generating the baseline initialization coordinates, responsive to the standard deviation of the inverses of the plurality of distances being less than the first scaled value of the mean of the inverses of the plurality of distances, and responsive to the mean of the inverses of the plurality of distances plus the standard deviation of the inverses of the plurality of distances being less than the second scaled value; and
generating a 3D image based on the baseline initialization coordinates.

11. The imaging system of claim 10, wherein the refraining from generating the baseline initialization coordinates comprises:
receiving a third 2D image;
identifying a plurality of third feature points in the third 2D image that correspond to the plurality of first feature points in the first 2D image;
estimating an updated plurality of distances based on corresponding ones of the plurality of first feature points and based on corresponding ones the plurality of third feature points;
generating an updated mean and an updated standard deviation of the inverses of the updated plurality of distances; and
generating the baseline initialization coordinates based on the updated mean and the updated standard deviation.

12. The imaging system of claim 11,
wherein the third 2D image is captured by the image capturing system at a third location that is different from a first location where the first 2D image was captured and is different from a second location where the second 2D image was captured, and
wherein the first location is different from the second location.

13. The imaging system of claim 12, wherein the receiving the third 2D image from the image capturing system comprises:
receiving the third 2D image from the image capturing system, responsive to the third location associated with the third 2D image being less than a threshold angular separation from the first location associated with the first 2D image; and
refraining from generating the baseline initialization coordinates, responsive to the third location associated with the third 2D image being greater than the threshold angular separation from the first location associated with the first 2D image.

14. The imaging system of claim 11, wherein the generating the baseline initialization coordinates based on the updated mean and the updated standard deviation comprises:
generating the baseline initialization coordinates, responsive to the updated standard deviation of the inverses of the plurality of distances being greater than the scaled value of the updated mean of the inverses of the plurality of distances, and responsive to the updated mean of the inverses of the plurality of distances plus the updated standard deviation of the inverses of the plurality of distances being greater than the second scaled value; and
refraining from generating the baseline initialization coordinates, responsive to the updated standard deviation of the inverses of the plurality of distances being less than the scaled value of the updated mean of the inverses of the plurality of distances, or responsive to the updated mean of the inverses of the plurality of distances plus the updated standard deviation of the inverses of the plurality of distances being less than the second scaled value.

15. The imaging system of claim 10, wherein the processor is configured to perform operations further comprising:
receiving a user input indicating that the 3D image is to be generated,
wherein the first 2D image is captured at a time before a second 3D image is captured.

16. A computer program product for operating an image capturing system, the computer program product comprising a non-transitory computer readable storage medium having computer readable program code embodied in the medium that when executed by a processor causes the processor to perform the method of claim 1.

* * * * *